United States Patent [19]
Kersey

[11] Patent Number: 5,438,411
[45] Date of Patent: Aug. 1, 1995

[54] ELECTRONIC PHASE-TRACKING OPEN-LOOP FIBER OPTIC GYROSCOPE

[75] Inventor: Alan D. Kersey, Springfield, Va.

[73] Assignee: The United States of America as represented by the Secretary of the Navy, Washington, D.C.

[21] Appl. No.: 937,566

[22] Filed: Aug. 31, 1992

[51] Int. Cl.⁶ .............................................. G01C 19/72
[52] U.S. Cl. .................................................. 356/350
[58] Field of Search .......................................... 356/350

[56] References Cited

U.S. PATENT DOCUMENTS

| | | | |
|---|---|---|---|
| 4,687,330 | 8/1987 | Lefevre | 356/350 |
| 4,707,136 | 11/1987 | Kim | 356/350 |
| 4,998,822 | 3/1991 | Steele | 356/350 |

OTHER PUBLICATIONS

Publication, "Open-Loop Output and Scale Factor Stability In a Fiber-Optic Gyroscope", by R. P. Moeller et al., IEEE J. Lightwave Technology, vol. 7, No. 2, pp. 262-269, Feb. 1989.
Publication, "Pseudo-Heterodyne Detection Scheme for the Fibre Gyroscope", by A. D. Kersey et al. Electronics Letters, vol. 20, No. 9, pp. 368-370, 26 Apr. 1984.
Publication, "An Amplitude Switched Fiber Optic Gyroscope", by N. J. Frigo, OFS '86, Tokyo, (Proceedings of the Fourth International Conference on Optical Fiber Sensors—Conference held in Tokyo, Japan), four pages, 1986.
Publication, "Electronic Interferometric Sensor Simulator/Demodulator", by A. B. Tveten et al., Proceedings of 5th Int. Conference on Optical Fiber Sensors, New Orleans, pp. 277-280, 1988.
Publication, "Novel Analog Phase Tracker for Interferometric Fiber Optic Sensor Applications", by T. A. Berkoff et al., SPIE Proc., vol. 1367, San Jose, Calif., pp. 53-58, 1990.
Publication, "Wide Dynamic Range Phase-Tracking Signal Processing Scheme for the Open Loop Fiber Optic Gyroscope", by A. D. Kersey et al., Proc. OFS '90, Sydney, Australia, four pages, Dec. 1990.
Publication, "Fiber Optic Gyroscope with All-Digital Closed-Loop Processing", by H. J. Arditty et al. Proc. 6th Int. Conf. on Optical Fiber Sensors (OFS '89), pp. 131-136, Springer-Verlag, Paris, 1989.
Publication, "Single-Channel Phase-Tracker for the Open Loop Fiber Optic Gyroscope", by A. D. Kersey et al., SPIE Conference on Fiber Optic Gyros, Sep. 1991.

*Primary Examiner*—Samuel A. Turner
*Attorney, Agent, or Firm*—Thomas E. McDonnell; George Jameson

[57] ABSTRACT

A simplified signal processing technique for the open-loop fiber optic gyroscope is described which is based on the electronic closed-loop 'phase-shift nulling' concept. The system provides a linear output from an open-loop gyroscope configuration over a ±2 pi radian range in Sagnac phase shift with good linearity and relatively low noise and drift. An alternative embodiment is disclosed utilizing, for example, a Mach-Zehnder interferometer for mixing the signals.

13 Claims, 6 Drawing Sheets

ELECTRONIC PHASE-TRACKING OPEN-LOOP FIBER OPTIC GYROSCOPE

TECHNICAL FIELD

The present invention relates to optical measuring and testing using fiber optic gyroscope apparatus and related signal processing methods based on the optical ring interferometer, and more particularly to gyroscopes (or "gyros") relying on the measurement of the Sagnac phase shift induced by clockwise (CW) and counterclockwise (CCW) propagating beams developed from a single light signal. More particularly, a simplified signal processing technique based on closed-loop phase-shift nulling is disclosed herein.

BACKGROUND OF THE INVENTION

Closed-loop Sagnac phase shift detection approaches for high precision, low drift (approximately 0.01 degrees per hour) and wide dynamic range sensing applications, such as inertial navigational systems, have been developed in recent years. These systems are known to be highly accurate and expensive to construct. Examples are included in *Proceedings of the 10th Anniversary Conference on Fiber Gyros*, H. Arditty et al., The Society of Photo-Optical Instrumentation Engineers, Vol. 719, Cambridge, Mass., 1986 and in "Fiber Optic Gyroscope with All-Digital Closed-Loop Processing," *Proceedings of the Sixth International Conference on Optical Fiber Sensors*, OFS '89, pp. 131 et seq., Springer-Verlag, Paris, 1989.

These approaches typically involve complex and high speed electronic signal processing schemes and integrated optical components to provide a precise non-reciprocal phase shift in a highly linear fashion for introduction into the Sagnac interferometer to counterbalance the rotation-induced Sagnac phase shift. Such apparatus has been too complex and prohibitively expensive for less-demanding applications, where minimum detectable rotations of approximately 1 to 10 degrees per hour and linearity of approximately 0.1 to 1 percent may well be adequate.

Open-loop gyroscopes provide a lower cost option for many medium performance applications, but these gyroscopes are limited by a number of factors. For example, the output of an open-loop gyroscope depends sinusoidally on the Sagnac phase shift, and thus the rotation rate. This leads to non-linearity, and also to a limited dynamic range. See "Fiber Optic Rotation Sensors and Related Technologies," *Springer Series in Optical Sciences*, Vol. 32, S. Ezekiel and J. J. Arditty, editors, New York; Springer-Verlag, 1982 and in "Open-Loop Output and Scale Factor Stability in a Fiber Optic Gyroscope," R. P. Moeller et al, *IEEE Journal of Lightwave Technology*, Vol. 7, pp. 262 et seq., 1989.

Furthermore, the scale factor depends directly on the source intensity and on the fringe visibility. The output must be normalized to accommodate these factors in order to eliminate bias and scale factor drift. These problems are discussed at greater length in "Pseudo-Hetrodyne Detection Scheme for the Fiber Gyroscope," A. D. Kersey et al., *Electronic Letters*, Vol. 20, pp. 368 et seq., 1984 and also in "An Amplitude Switched Fiber Optic Gyroscope," N. Frigo, *Proceedings of the Fourth International Conference on Optical Fiber Sensors*, OFS '86, pp. 181 et seq., OITDA, Tokyo, 1986.

The magnitude of the Sagnac phase shifts is given by Equation 1:

$$2\phi_s = \frac{8\pi NA}{\lambda c} \Omega \qquad (1)$$

wherein:
A is the cross-sectional area of the fiber,
N is the number of fiber turns,
$\lambda_o$ is the wavelength of the light, and
$\Omega$ is the rotation rate.

Generally, higher sensitivity measurements require the detection of phase shifts smaller than $10^{-6}$ radians. Due to the interferometer transfer function, however, the output becomes nonlinear at higher rotation rates, and if $\Delta\phi_s$ exceeds one-half pi radians the output becomes ambiguous.

In view of the known limitations and shortcomings of the prior art devices, as well as other disadvantages not specifically mentioned above, it should be apparent that there still exists a need in the art for a low-cost electronic phase-tracker for open-loop fiber optic gyroscope apparatus.

It is, therefore, a primary object of this invention to fulfill that need by providing a low-cost, wide dynamic range demodulation technique which is relatively easy and inexpensive to construct.

SUMMARY OF THE INVENTION

Briefly described, the aforementioned objects and advantages are accomplished according to the present invention by providing an analog phase tracking configuration for the open-loop fiber optic gyroscope which electronically performs a closed-loop "phase shift nulling" type of signal processing function. The present invention provides wide dynamic range phase tracking and can be implemented using relatively low-cost electronic devices in place of expensive optical components. See also "Electronic Interferometer Simulator/Demodulator", *Proceedings of the Fifth International Conference on Optical Fiber Sensors*, OFS '88, pp. 277 et seq., New Orleans, 1988. Simplified versions of an earlier phase tracking scheme previously developed are discussed in the paper "Novel Analog Phase Tracker for Interferometric Fiber Optic Sensor Application," T. A. Berkoff et al., *Proceedings of the Society of Photo-optical Instrumenta-tion Engineers*, Vol. 1367, pp. 53 et seq., San Jose, Calif., 1990 and in the paper "Wide Dynamic Range Phase Tracking Signal Processing Scheme for the Open-Loop Fiber Optic Gyroscope," *Proceedings of the Seventh International Conference on Optical Fiber Sensors*, OFS '90, New Orleans, 1990.

The disclosed apparatus and method represents a simple, wide range analog phase tracker for the open-loop fiber optic gyroscope which advantageously can be implemented using very low-cost components. The invention replicates the operation of a true closed-loop fiber optic gyroscope by using electronic phase tracking with the mixing of the fiber optic gyroscope output with a reference interferometric signal. This approach is suitable for medium- and lower-demand gyroscope applications where open-loop optical configurations and low-cost electronic signal processing are desirable.

With the foregoing and other objects, advantages, and features of the invention which will become hereinafter apparent, the nature of the invention may be more clearly understood by reference to the following detailed description of the invention, the appended claims, and to the several views illustrated in the attached drawings.

BRIEF DESCRIPTIONS OF THE DRAWING FIGURES

In all views of the following drawing figures, like reference characters indicate corresponding parts or elements.

DETAILED DESCRIPTION OF THE INVENTION

Introduction

Figure 1:
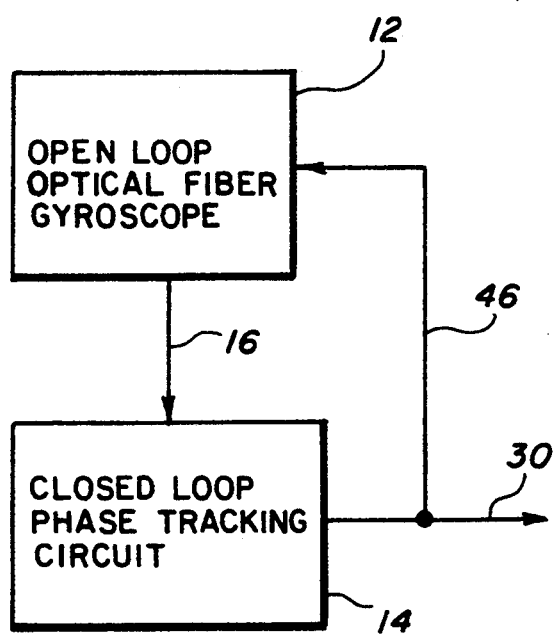
FIG. 1 is a simplified block diagram of the present invention.

The optical configuration of the invention disclosed herein is similar to that of a conventional open-loop gyroscope using dynamic phase shift biasing. The operation simulates that of a true closed-loop gyroscope, wherein the phase shift nulling is done primarily electronically rather than optically per se. Referring to FIG. 1, the invention incorporates two main subsystems or fiber optic gyroscope loop: an open loop optical fiber gyroscope subsystem 12 for producing the Sagnac phase shift and a closed loop phase-tracking circuit 14 receiving the open-loop gyroscope optical output or signal $S_g$ 16 for converting and processing of the optical signals. A more detailed illustrative block diagram of the closed loop phase tracking circuit 14 is shown in FIG. 2.

Figure 2:
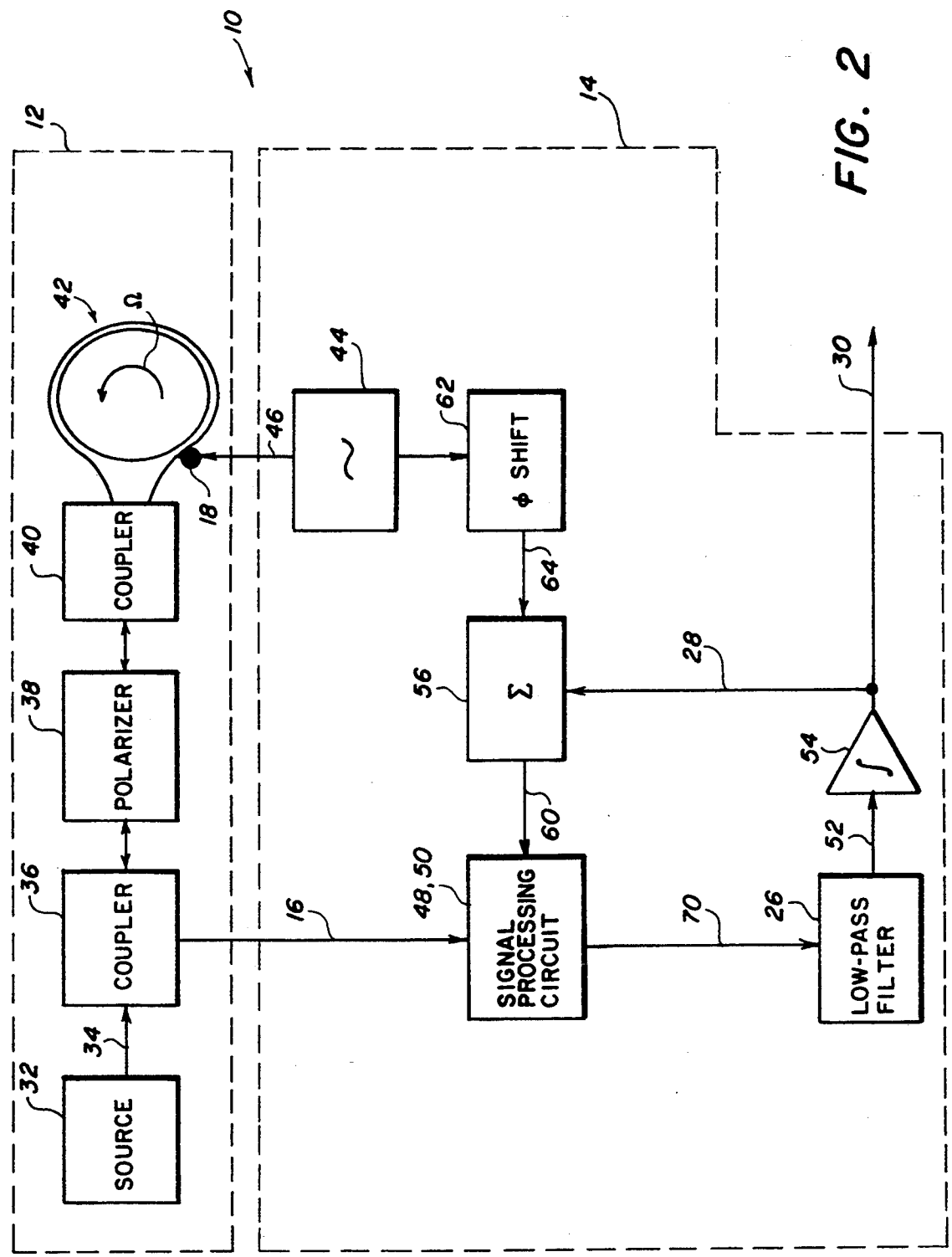
FIG. 2 is an expanded schematic block diagram of the single-channel phase tracking electronics and open-loop gyroscope system of FIG. 1.

Referring now to FIG. 2, a time-varying phase modulation differential (between the CW and CCW optical beams) value, $\Delta\phi\sin\omega t$, is applied via a piezoelectric transducer 18 located in the fiber optic gyroscope loop 12. The use of a piezoelectric transducer for the introduction of a time varying phase modulation between the CW and CCW propagating beams in a fiber gyro is well known and understood by those skilled in the art. The open-loop gyroscope signal can be expressed as in Equation 2:

$$S_g = \tfrac{1}{2}\eta I_0 \alpha \{1 + k\cos(\Delta\phi\sin\omega t + 2\phi_s)\} \quad (2)$$

wherein:
$I_o$ is the source intensity,
$\alpha$ is a factor accounting for loss in the system,
k is the fringe visibility,
$\eta$ is the detector efficiency in amperes per watt, and
$2\phi_s$ is the rotation-induced Sagnac phase shift.

The Sagnac phase shift is given there by Equation 3:

$$2\phi_s = \frac{\{4\pi RL\, \Omega\}}{\lambda_0 c} \quad (3)$$

wherein:
R is the radius of the fiber coil,
L is the total length of fiber in the loop,
$\lambda_o$ is the vacuum wavelength of the source radiation,
c is the velocity of light, and
$\Omega$ is the rotation rate.

In the primary embodiment of the present invention, the gyroscope output $S_g$ 16 is detected by a detector or photodetector 66 (FIG. 3) and AC coupled by a DC blocking circuit 68 to produce the signal $S_{g(ac)}$ 24 which is then fed to a multiplier or analog multiplier 20. An alternative approach where this processing is carried out in the optical domain is described later. The multiplier 20 mixes the harmonic components of the gyroscope output with an electronically generated quadrature shifted sine function signal $S_r$ 22 according to Equation 4:

$$S_r \approx \sin(\Delta\Psi\sin\omega t + \omega_r) \quad (4)$$

wherein:
$\Psi_r$ is the relative phase shift, and
$\Delta\Psi\sin\omega t$ is the phase modulation.

This produces the composite signal or composite interferometric signal 70 of Equation 5:

$$S_r \times S_{g(ac)} = \tfrac{1}{2}\eta I_0 \alpha k\{\cos(\Delta\phi\sin\omega t + 2\phi_s) - \quad (5)$$

$$J_0(\Delta\phi)\cos 2\phi_s\}\sin(\Delta\Psi\sin\omega t + \Psi_r)$$

wherein $S_{g(ac)}$ is the detected gyroscope signal 24 after being passed through the dc block (i.e., the ac coupled version of $S_g$).

Passing the composite signal or composite interferometric signal 70 from the multiplier 20 (FIG. 3) through a low pass filter 26 (FIG. 2), having a cut-off frequency $<<\omega$, yields a phase tracking error signal 52 of the form of Equation 6:

$$S_0 = \tfrac{1}{2}\eta I_0 \alpha k\{J_0(\Delta\phi - \Delta\Psi)\sin[2\phi_s - \Psi_r] + \quad (6)$$

$$J_0(\Delta\phi + \Delta\Psi)\sin[2\phi_s + \Psi_r] - J_0(\Delta\phi)J_0(\Delta\Psi)\cos 2\phi_s \sin\Psi_r\}$$

The error signal 52 is fed to an integrator or electronic integrator circuit 54 which generates a feedback signal or feedback bias control signal $V_r$ 28 used to control the phase bias of the sine generator 58 (FIG. 3) used to produce the reference sine function signal 22. In order to accomplish this, the feedback signal 28 is electronically added to the reference modulation signal 64 derived from the phase shifter 62 using an electronic summer or adder circuit 56 to form the phase shifted reference oscillator signal or reference signal 60 which is coupled to the sine generator 58.

In general, the error signal $S_o$ 52 has three components, which are dependent on the phase terms $2\phi_s$ and $\Psi_r$. When the sum of the modulation indices $(\Delta\phi + \Delta\Psi)$ equals 2.405, 5.520, 8.650 radians (or other root of the $J_0(z)$ function), the term dependent on the sine of this sum (Equation 6) is suppressed. The second root at 5.520 radians is used to realize this. Additionally, setting either $\Delta\phi$ or $\Delta\Psi$ to 2.405 radians (and the other at 3.115 radians) eliminates the third term in Equation 6. The output then reduces to one of the form in Equation 7:

$$S_O = \tfrac{1}{2}\eta I_O \alpha k \{J_0(0.75) \sin [2\phi_s - \Psi_r]\} \quad (7)$$

wherein the argument of the $J_0(z)$ function is determined by the index difference $(\Delta\Psi - \Delta\phi) = 0.75$ for the above phase modulation indices. This signal then has one component which is dependent on the sine of the difference in phase between the gyroscope and the electronically synthesized interferometric signal $(2\phi_s - \Psi_r)$. This is the form of signals generated with true closed-loop gyroscope configurations, wherein the phase $\Psi_r$ is optically introduced in the fiber loop to directly null the Sagnac phase shift. In the present invention, however, the output of Equation 7 is electronically synthesized from the output of an open-loop gyroscope using $S_o$ as the error signal 52 in a control loop configured to maintain $\Psi = 2\phi_s$, the output value $S_o$ can be nulled, and the two interferometer signals (gyroscope output and reference) are therefore locked in phase quadrature. The Sagnac phase shift, (and thus, the gyroscope rotation rate) can then be determined from the value of $\Psi_r$ and the feedback control voltage $V_r$ 28 can be determined using Equation 8:

$$\Omega = \left(\frac{\lambda_0 c}{4\pi RL}\right)\Psi_r + \left(\frac{\lambda_0 c}{4\pi RL}\right)\gamma V_r \quad (8)$$

wherein $\gamma$ is the voltage-to-phase shift conversion factor for the reference sine function generator.

With the system retained at a null value by using feedback control of the relative shift, $\Psi_r$, the pre-factor in Equation 9 is:

$$\tfrac{1}{2}\eta I_O \alpha k J_0(0.71) \quad (9)$$

and it affects only the gain-bandwidth product of the feedback loop, and thus with a useful approximation, the source intensity and fringe visibility fluctuations do not affect the measured Sagnac phase shift, as is the case in true closed-loop gyroscope systems.

Gyroscope Optical Details

An open-loop gyroscope useful in testing the operation and performance of the disclosed signal processing approach was described in "1.06 μM All-Fiber Optical Gyroscope", Burns, W. K. et al, Proceedings of the Society for Optical Engineering, Vol. 1585, 4–6 Sep. 1991, (Boston, Mass.).

A 1.06 micrometer all-fiber open-loop optical gyroscope subsystem 12, using a fiber optic superfluorescent source 32, is shown in detail in FIG. 2. Fiber optic superfluorescent sources promise long lifetimes and stable wavelengths, as compared with the known shortcomings of semiconductor broadband sources. Broadband fiber sources at both 1.06 micrometers and 1.55 micrometers have been developed and are known in the art. Operating gyroscopes at each wavelength are believed known in the art.

As will be realized by anyone skilled in the art, the use of a fiber source is not a requirement for the operation of the phase tracker described herein, and any low-coherence source is suitable for good gyro performance.

Referring now to FIG. 2, source 32 provides the optical power, or light needed by the gyroscope subsystem 12. A superfluorescent fiber light source 32 is preferred. Source fiber 34 was spliced to a 1.06 micrometer isolator (not shown; for purposes of the experiment) having a −4 decibel insertion loss, which in turn was spliced to input coupler 36 of an open-loop gyroscope formed by coupler 36, polarizer 38, coupler 40, fiber coil or gyroscope fiber coil 42, and piezoelectric transducer (fiber stretcher) or modulator 18. The remaining fiber lengths in the gyroscope loop subsystem 12 can be polarization preserving fiber such as that fabricated by and available from Hitachi Cable. The couplers 36, 40, and polarizer 38 are also available from Hitachi Cable. Equivalent couplers, polarizers, and cable from other sources may be used. Splices on each side of the experimental isolator, if used, can be expected to exhibit insertion losses of about 1 decibel each while the gyroscope loop subsystem 12 insertion loss can be expected to be about 22.5 decibels. A fiber coil 42 1 kilometer in length is suitable; it can be quadruple wound on a 16 centimeter radius.

A gyroscope constructed in this manner can result in an optical scale factor of:

0.10985 radians/(degrees/second)
(∼6.3°/(degrees/second)).

Thus, a rotation rate of ∼28.6 degrees per second is sufficient to induce a Sagnac phase shift $2\phi_s = \pi$.

Gyroscope Phase Loop Details

Phase modulation in the optical gyroscope can be applied by the application of a phase modulation voltage or signal ω 46 from an oscillator or oscillator source 44 to the piezoelectric transducer (fiber stretcher) 18 which is located near one end of the fiber coil 42 (FIG. 2). The open-loop gyroscope optical output 16 is electrically detected by the detector 66 (FIG. 3) and then the resultant electrical signal is AC-coupled by a DC blocking circuit 68 to produce and apply a signal $S_{g(ac)}$ 24 to the multiplier 20. A reference sine generator or function generator 58 supplies the reference sine function signal 22 to the multiplier 20.

Figure 3:
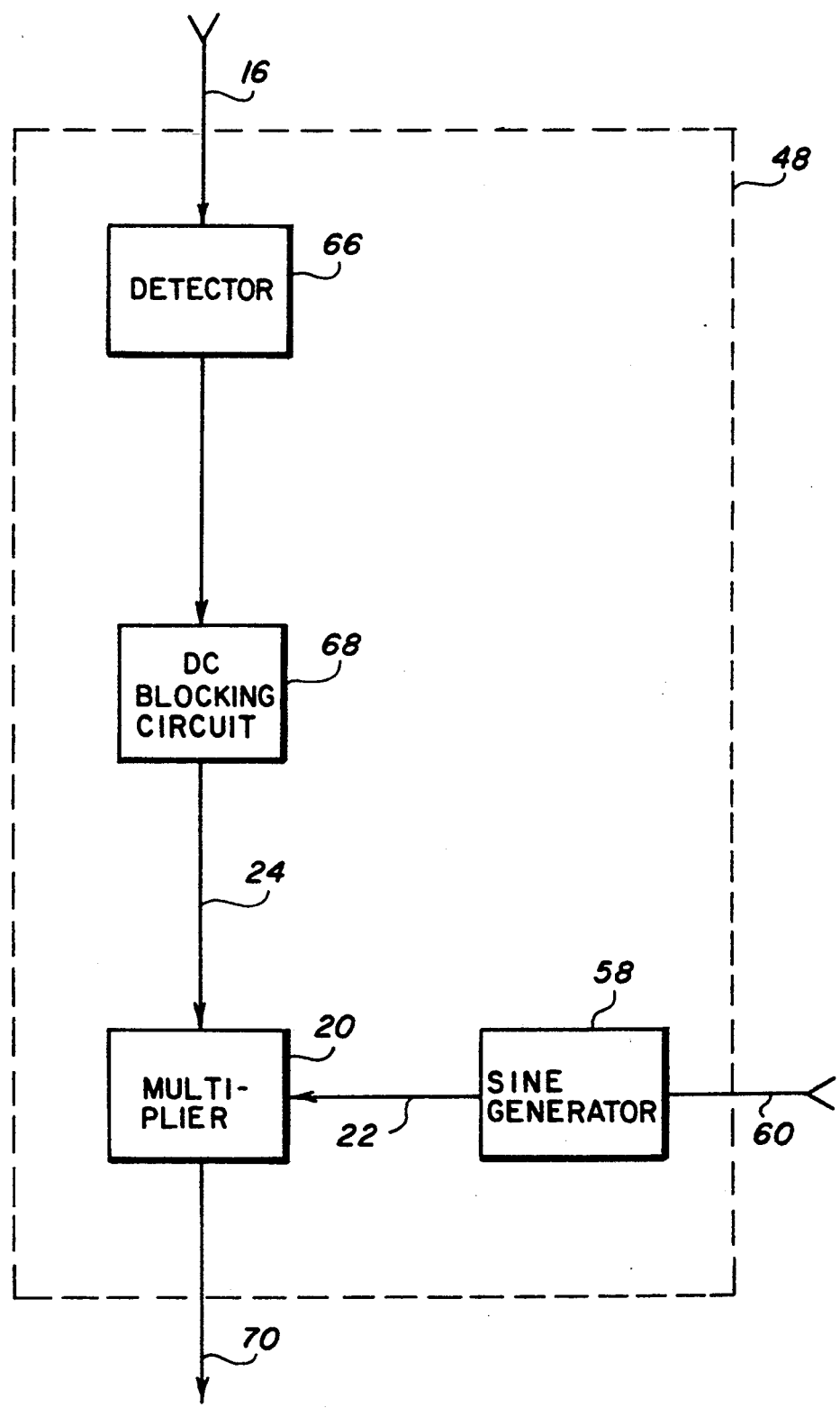
FIG. 3 illustrates the signal mixing portion of the FIG. 1 invention using an electronic, reference interferometer synthesizer, analog multiplier embodiment.

The electronic mixer circuit or signal processing circuit 48 embodiment of the present invention shown in FIG. 3 is based on a simple, low-cost function generator 58. Suitable devices include an Analog Devices type AD 639 trigonometric function generator, which has an operational range of ±550 degrees (∼±3π radians), and a voltage to phase coefficient $\gamma = 50$ degrees per volt. Equivalent devices may be used.

In FIGS. 2 and 3, the phase modulation signal ω 46 from oscillator source 44 is applied to the fiber coil 42 and also phase shifted by phase shifter 62 (to account for optical delay and the piezoelectric stretcher/modulator 18 response) to provide a reference modulation signal 64 to the summer 56. Summer 56 also receives the feedback signal 28 from the integrator circuit 54 and the two signals are added and applied to the sine generator 58 (FIG. 3)

The ac-coupled, open-loop gyroscope electrical signal 24 (FIG. 3) is multiplied by the synthesized reference sine function signal $S_r$ 22 to produce a composite interferometric signal. The phase modulation indices can be set where $\Delta\phi = 2.405$ and $\Delta\Psi = 3.115$ radians precisely to satisfy the required operating condition dictated by Equation 6. It should be noted that selecting a setting of $\Delta\phi = 2.405$ radians has certain advantages in terms of maintaining this modulation index through a feedback loop to the piezoelectric modulator 18, due to the fact that $J_o(\Delta\phi)$ is nulled for this index.

Referring to FIG. 2, after being low pass filtered by the low pass filter 26, the composite interferometric signal 70 is reduced to the error signal 52 which is then integrated by the electronic integrator circuit 54 to produce a feedback bias control signal $V_r$ 28 which is applied to the reference interferometer sine generator 58 (FIG. 3) via the electronic summer 56. The elements comprising the multiplier 20 (FIG. 3), low-pass filter 26, integrator 54 and summer 56 and associated electronic connections form an electronic feedback circuit or phase locked loop. With the feedback loop thus closed, the signal $S_o$ is nulled and the phase adjust input $V_r$ provides a direct linear measurement of the Sagnac phase shift at output 30.

Figure 4:
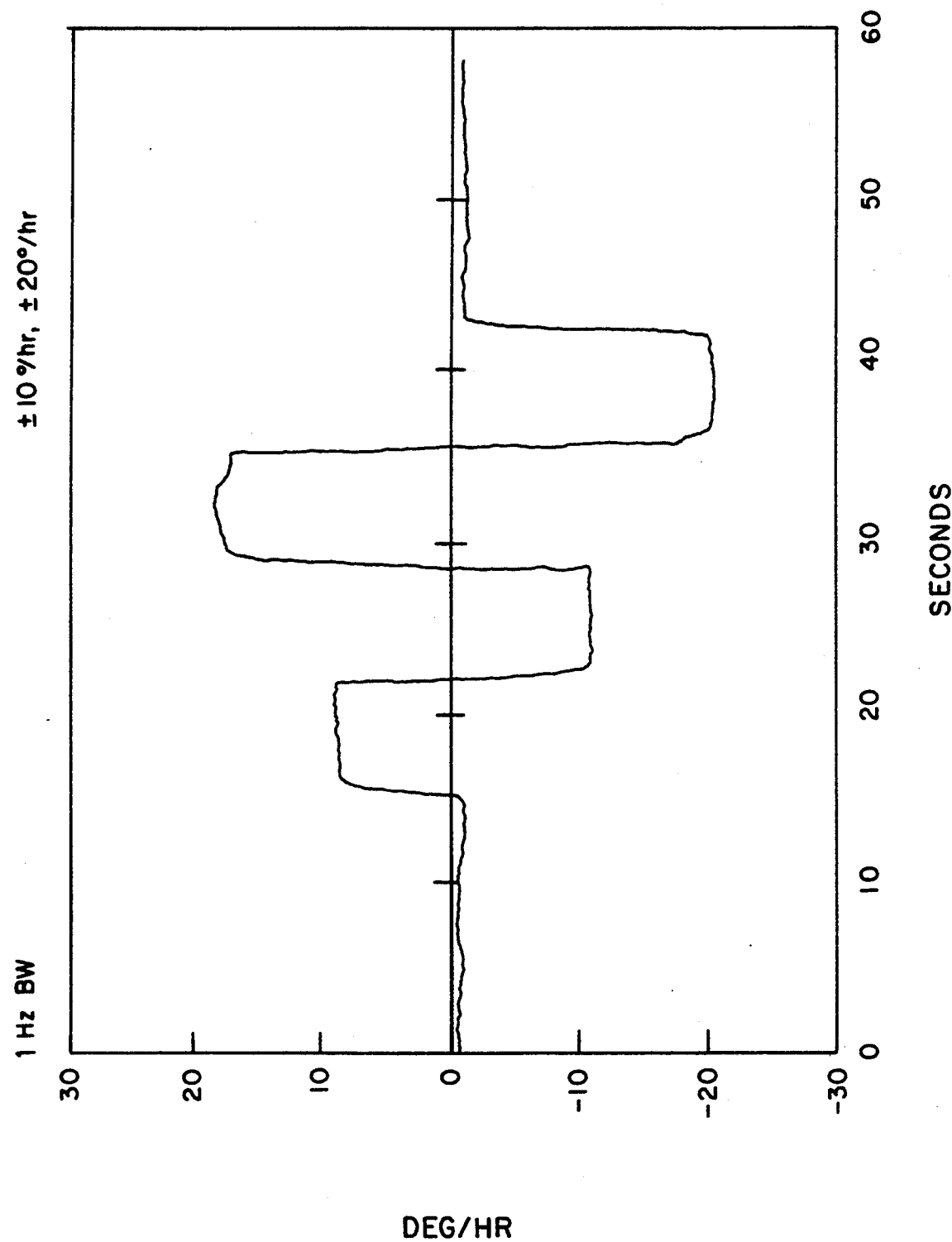
FIG. 4 illustrates the rotation rate performance of the phase tracker.

FIG. 4 shows the phase tracker output at rotation rates of ±10 degrees per hour and ±20 degrees per hour. The resolution of the present invention is shown to be in the 1 degree per hour range.

Figure 5:
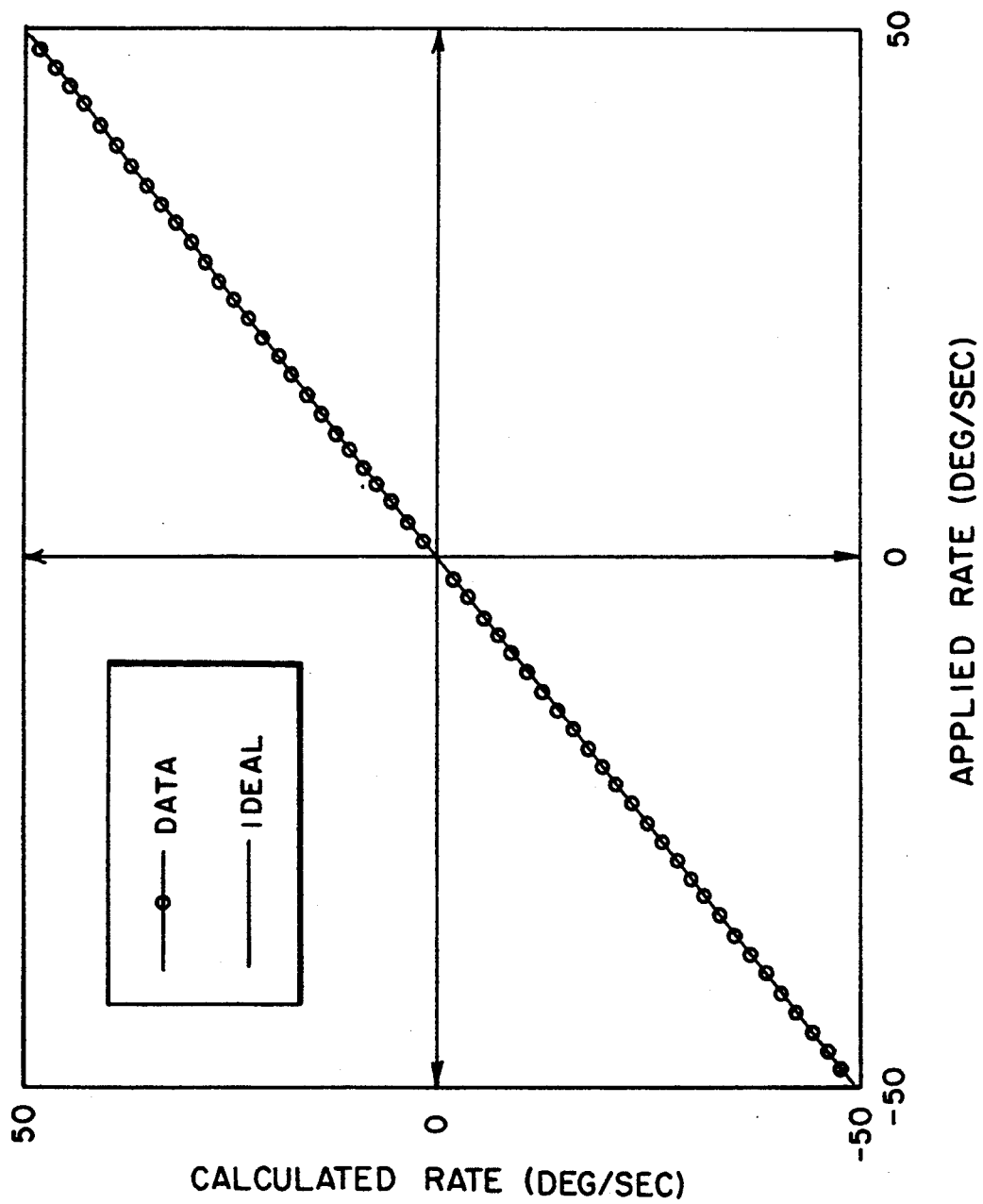
FIG. 5 illustrates the performance of the invention of FIG. 1 over the range −50 to +50 degrees per second, corresponding to a range in Sagnac phase shift of ±5.5 radians.

FIG. 5 shows the output voltage 30 vs rotation rate $\omega$ of the gyroscope fiber coil 42, plotted over a ±50 degrees per second range. The data in FIG. 5 represents a measurement range in Sagnac phase shift of about ±5.5 radians, which is well beyond the normal operational range of conventional open-loop gyroscope systems. A linear fit of the experimental data plotted in FIG. 5 shows a deviation from linearity of <±0.1% over the zero to +50 degrees per second range. The deviation for the range zero to −50 degrees per second was higher (~±0.4%) which is attributed to an anomaly with the reference sine generator device used.

Figure 6:
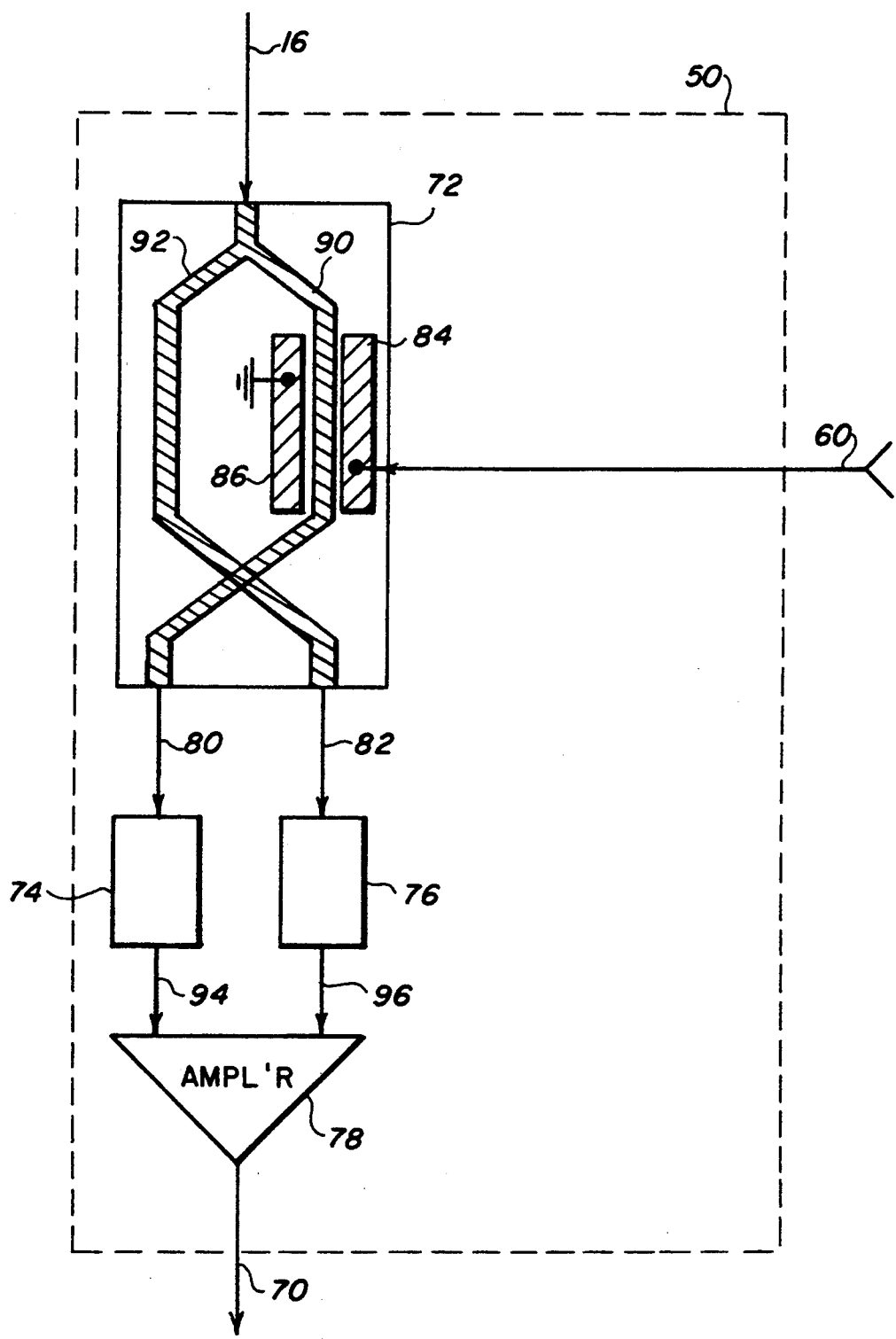
FIG. 6 illustrates the signal mixing portion of the FIG. 1 invention using an integrated optical Mach-Zehnder interferometer analog multiplier embodiment.

In an alternative embodiment of this invention, an integrated optic interferometer chip can be used to generate a reference interferometric signal. FIG. 6 shows a simple schematic diagram of an alternative embodiment utilizing this approach. This configuration would provide higher precision than electronic generation as previously described, at a cost premium which is, however, believed acceptable in many applications. In this case, the mixing of the output $S_g$ 16 of the open-loop gyroscope 12 with a reference interferometer signal is accomplished in the optical domain using an integrated optic Mach-Zehnder interferometer modulator (MZ) 72 (FIG. 6).

Referring to FIG. 6, the optical gyroscope output 16 of the open-loop gyroscope 12 is coupled directly to the MZ interferometer modulator 72. The MZ interferometer modulator 72 has a cosine transfer function, such that the intensity of light passed to one output part 80 can be expressed as:

$$I_1 = I_o\alpha\{\tfrac{1}{2}(1+\cos\theta)\} \tag{10}$$

whereas the intensity at the second output port 82 is complementary in nature, and can be written according to the expression:

$$I_2 = I_o\alpha\{\tfrac{1}{2}(1-\cos\theta)\} \tag{11}$$

wherein $\theta$ is the phase difference of light between the two arms 90 and 92 of the MZ interferometer modulator 72 and is a function of the voltage applied across the electrodes 84 and 86, and $I_o$ is the intensity of the light input to the MZ interferometer modulator 72, and $\alpha$ accounts for optical losses. Photodetectors 74 and 76 detect the optical signals from the output ports 80 and 82 of the MZ interferometer modulator 72 and respectively produce electronic signals 94 and 96. The electronic signals 94 and 96 are fed to a difference amplifier 78 to provide the composite interferometric signal 70. Photodetectors 74 and 76 and difference amplifier 78 provide for what is termed 'balanced detection' of the output signals from output parts 80 and 82 of the MZ interferometer modulator 72. The form of the composite interferometric signal 70 from the difference amplifier 78 can be expressed as $$\begin{aligned} S_d &= \eta(I_1 - I_2) \\ &= \eta\alpha I_o\alpha\cos\theta \end{aligned} \tag{12}$$

wherein $\eta$ is the photodetector responsivity (amperes/watt). With the gyroscope optical output 16 coupled into the MZ interferometer modulator 72 (i.e. in place of $I_o$ in Equation (12)), and applying the phase shifted reference oscillator signal 60 to the electrode 84 of the MZ interferometer modulator 72 (with electrode 86 at ground potential), the MZ interferometer modulator 72 effectively modulates the gyroscope optical output 16 by the cosine of the phase shifted reference oscillator signal 60 to produce an output 70 from the difference amplifier 78 of the form of Equation 5. With the modulation indices set according to the previously discussed values, the output of the difference amplifier 78, after passing through the low pass filter 26 (FIG. 2), reduces the error signal 52 of the form of Equation 7.

Although certain presently preferred embodiments of the invention have been described herein, it will be apparent to those skilled in the art to which the invention pertains that variations and modifications of the described embodiment may be made without departing from the spirit and scope of the invention. For example, the closed-loop, phase tracking circuit 14 could be implemented to utilize and operate with digital (instead of analog) electronic components, wherein various components, such as the multiplier 20 (FIG. 3) or reference sine generator 58 are digital electronic components. In such an implementation, the closed loop tracking circuit could be based completely on digital electronics, or be a hybrid/analog system with, for instance, the sine function being generated using a ROM look-up table with analog-to-digital conversion at its input and output terminals. Accordingly, it is intended that the invention be limited only to the extent required by the appended claims and the applicable rules of law.

I claim:

1. An electronic phase-tracking open-loop fiber optic gyroscope apparatus, comprising:

an optical gyroscope responsive to a modulation signal for developing a phase-shifted optical signal output;

a modulator signal source for producing the modulation signal;

phase shift means responsive to the modulation signal for producing a reference modulation signal;

summer means responsive to the reference modulation signal and to a feedback signal for producing a reference signal;

signal processing means responsive to the optical signal output and the reference signal for producing a composite signal;

means for filtering the composite signal to produce an error signal; and an integrator responsive to the error signal for producing and applying the feedback signal to said summer means and producing an electrical system output signal related to the phase-shift of the optical signal output.

2. The apparatus of claim 1, wherein said signal processing means includes an electronic multiplier.

3. The apparatus of claim 1 wherein said signal processing means includes:
an optical-electrical detector for converting the optical signal output to an electrical signal;
sine function generator means responsive to the reference signal from said summer means for producing a reference sine function signal; and
an electronic multiplier for multiplying the electrical signal by the reference sine function signal to produce the composite signal.

4. The apparatus of claim 1, wherein said signal processing means includes an optical interferometer.

5. The apparatus of claim 4, wherein the optical interferometer is a Mach-Zehnder interferometer having first and second optical paths, the optical signal output being coupled to said first and second optical paths and the reference signal being coupled to said second optical path for modulating the optical signal output on the second optical path.

6. The apparatus of claim 5, including first and second interferometer optical-electrical detector means for detecting the signals on the first and second optical paths and for producing first and second detector outputs, and a differencing amplifier having first and second inputs coupled to the respective first and second detector outputs.

7. The apparatus of claim 1, wherein said filter means is a low-pass filter.

8. The apparatus of claim 1, wherein said integrator is an electronic integrating amplifier circuit.

9. The apparatus of claim 1, wherein the optical gyroscope includes a phase modulator.

10. A fiber optic gyroscope apparatus comprising:
an open loop fiber optic gyroscope including a phase modulator and having a phase-shifted optical signal output; and
a closed loop phase tracking circuit comprising:
a modulator signal source for producing and applying a modulation signal to said phase modulator of said open loop fiber optic gyroscope;
means responsive to the modulation signal and to a feedback signal for developing a reference signal related to the modulation signal; and
means for mixing the reference signal and the phase-shifted optical signal output to produce an electrical signal output related to the phase shift of the phase-shifted optical signal output and for feeding back to said developing means a portion of the electrical signal output as the feedback signal.

11. A fiber optic gyroscope system comprising:
an open loop fiber optic gyroscope, including a phase modulator, for generating a Sagnac phase-shifted optical signal;
a closed loop phase tracking circuit comprising:
a modulator signal source for producing and applying a modulation signal to said phase modulator of said open loop fiber optic gyroscope;.
means responsive to the modulation signal and to an electrical output signal for generating a phase-modulated reference sine function signal; and
means responsive to said Sagnac phase-shifted optical signal and said phase-modulated reference sine function signal for generating the electrical output signal.

12. A method of generating an electrical output signal from a fiber optic gyroscope apparatus, said method comprising the steps of:
generating a signal having a Sagnac phase-shift in an open loop fiber optic portion of the fiber optic gyroscope apparatus;
developing a phase-shifted modulator signal in a closed loop phase tracking circuit portion of the fiber optic gyroscope apparatus;
combining the phase-shifted modulator signal with a feedback signal in the closed loop phase tracking circuit portion of the fiber optic gyroscope apparatus to generate a reference signal;
utilizing the reference signal to generate a phase modulated reference sine function signal in the closed loop phase tracking circuit portion of the fiber optic gyroscope apparatus;
mixing in the closed loop phase tracking circuit portion of the fiber optic gyroscope apparatus the signal having the Sagnac phase-shift and the phase modulated reference sine function signal to produce an electrical output signal related to the Sagnac phase-shift; and
feeding back a portion of the the electrical output signal related to the sagnac phase-shift as the feedback signal.

13. The method of claim 12 wherein:
said developing step includes the steps of:
generating a modulator signal; and
phase shifting the modulator signal to develop the phase-shifted modulator signal; and
said utilizing step includes the step of:
applying the reference signal to a sine function generator to produce the phase modulated reference sine function signal.

\* \* \* \* \*